United States Patent [19]
Bendett et al.

[11] Patent Number: 5,302,835
[45] Date of Patent: Apr. 12, 1994

[54] LIGHT DETECTION SYSTEM HAVING A POLARIZATION PLANE ROTATING MEANS AND A POLARIZING BEAMSPLITTER

[75] Inventors: Mark Bendett; Masahiko Nakamura, both of Ann Arbor, Mich.

[73] Assignee: Imra America, Inc., Ann Arbor, Mich.

[21] Appl. No.: 35,177

[22] Filed: Mar. 22, 1993

[51] Int. Cl.⁵ .............................................. G01V 9/04
[52] U.S. Cl. ........................................ 250/561; 356/1
[58] Field of Search ................. 250/561, 206.2, 203.2; 356/1, 5, 141, 152; 364/443, 449

[56] References Cited
U.S. PATENT DOCUMENTS

| | | |
|---|---|---|
| 3,680,964 | 8/1972 | Granqvist . |
| 4,019,060 | 4/1977 | Woodman . |
| 4,243,877 | 1/1981 | Cruz . |
| 4,279,036 | 7/1981 | Pfund . |
| 4,355,895 | 10/1982 | Cairns et al. . |
| 4,552,456 | 11/1985 | Endo . |
| 4,632,543 | 12/1986 | Endo . |
| 4,687,916 | 8/1987 | Emoto et al. . |
| 4,786,176 | 11/1988 | Froome . |
| 4,829,172 | 5/1989 | Miller ....................................... 356/5 |
| 4,849,644 | 7/1989 | Mira et al. . |
| 4,902,126 | 2/1990 | Koechner . |
| 4,910,413 | 3/1990 | Tamune . |
| 4,958,072 | 9/1990 | Hofler et al. . |
| 4,986,653 | 1/1991 | Yokokura et al. . |
| 5,020,901 | 6/1991 | Groot ....................................... 356/5 |
| 5,081,345 | 1/1992 | Grenier et al. . |
| 5,114,226 | 5/1992 | Goodwin et al. . |
| 5,162,643 | 11/1992 | Currie . |

FOREIGN PATENT DOCUMENTS 2251750  7/1992  United Kingdom .

OTHER PUBLICATIONS

"Polarizing Beamsplitters", published by Melles Griot, pp. 14.18–14.19, copyrighted in Jan. 1990.
"Retardation Plates", published by Melles Griot, pp. 14.28–14.29, copyrighted in Jan. 1990.

Primary Examiner—David C. Nelms
Assistant Examiner—Que T. Le
Attorney, Agent, or Firm—Burns, Doane, Swecker & Mathis

[57] ABSTRACT

An optical detection system includes a transmitting device for transmitting a light beam to create a field of view, a detecting arrangement for detecting a beam of reflected light resulting from reflection of the transmitted light off at least one object in the field of view, and a deflecting device for deflecting either the transmitted light beam or the reflected light beam. The detecting arrangement can include a range channel having a first detector for sensing reflected light from the at least one object to determine a distance to the object, and an angle channel having a second detector for sensing reflected light from the at least one object to determine an angle of the reflected light beam. The deflecting device can be in the form of a polarizing beamsplitter. An arrangement can also be disposed between the deflecting device and the detecting device for splitting the reflected light beam into a first beam component which is directed to the first detector and a second beam component that is directed to the second detector. The transmitting device and the deflecting device are positioned with respect to one another in such a way that the transmitted light beam emerging from the deflecting device is coaxial with the reflected light beam entering the deflecting device. The system is particularly useful in the context of a vehicle guidance system for optically guiding a moving vehicle along a path. The sensing of the reflected light by the first and second detectors allows the distance from the moving vehicle to the at least one object and the angle of the reflected light beam to be accurately determined.

30 Claims, 3 Drawing Sheets

LIGHT DETECTION SYSTEM HAVING A POLARIZATION PLANE ROTATING MEANS AND A POLARIZING BEAMSPLITTER

FIELD OF THE INVENTION

The present invention pertains to a system and method for detecting light. More particularly, the present invention relates to a method and system for detecting the position of a moving device (e.g., an automobile) relative to an object along a path of intended travel (e.g., a road surface) so that control signals (e.g., steering control signals) necessary for maintaining path alignment can be anticipated.

BACKGROUND OF THE INVENTION

At least one type of system has been proposed for determining the position of moving devices, such as automobiles, along a designated path. That system is disclosed in U.S. Pat. No. 5,162,643 and is generally illustrated in FIG. 1. The system includes a light source 10, which can be in the form of a laser diode, for emitting a light beam 12. One or more retroreflectors 14, 14', 14" are positioned along the intended path of movement for reflecting light transmitted by the laser diode 10. When used to detect the position of a moving vehicle such as an automobile, the retroreflectors 14, 14', 14" can be positioned along the side of the road. The light source 10 mounted on the vehicle could then be directed forward of the vehicle movement to create a field of view.

The system also includes a range detection channel 16 and an angle detection channel 18, both of which are generally illustrated in FIG. 1. The range detection channel 16 and the angle detection channel 18 include a detector for sensing light. The transmitted light from the transmitted light beam 12 reflects off the retroreflectors 14, 14', 14" and returns toward the source 10 in the form of a reflected light beam 20. The detectors in the range detection channel 16 and the angle detection channel 18 sense the light from the reflected light beam so that the angle of the reflected light beam and the distance to the retroreflectors 14, 14', 14" can be determined.

Although the system illustrated in FIG. 1 and described in more detail in the aforementioned U.S. Pat. No. 5,162,643 is quite useful in determining the position of a moving object, such as an automobile, relative to a point or points in advance of the vehicle's direction of movement, it is susceptible of improvements. For example, as illustrated in FIG. 1, the light source 10, the range detection channel 16 and the angle detection channel 18 are positioned vertically above one another. As a result, three different optical axes are provided—the optical axis of the transmitted light beam 12, the optical axis of the portion of the reflected light beam 20 sensed by the detection channel 16, and the optical axis of the portion of the reflected light beam sensed by the angle detection channel 18. Those multiple optical axes necessitate that the housing which encases the various components be sufficiently large to accommodate the components. Thus, the housing cannot be as compact as might otherwise be the case.

Additionally, the system illustrated in FIG. 1 is designed in a way that inhibits the range detection channel and the angle detection channel from sensing a maximum amount of reflected light. As mentioned above, retroreflectors 14, 14', 14" are typically used to reflect the light transmitted by the light source 10. Those retroreflectors 14, 14', 14" are characterized by the fact that they reflect light along a path that is substantially the same as the path along which the transmitted light beam 12 travels. Thus, as seen in FIG. 1, the center portion (i.e., the central axis) of the reflected light beam 20 follows a path that is substantially parallel and coaxial with the central portion (i.e., central axis) of the transmitted light bean 12. However, the reflected light beam 20 diverges as it is reflected off the reflectors 14, 14', 14". The amount of light across the reflected light beam 20 is generally represented by the curve 22 shown in FIG. 1. As can be seen, the concentration or intensity of the light is greatest along the central axis that extends between the light source 10 and the reflector or retroreflector 14 (i.e., a line coaxial with the central axis of the transmitted light beam 12). Those portions of the light beam 20 located further away from that central axis possess lesser concentration. At the outer edges of the reflected light beam 20, the concentration of light is at a minimum.

Since, in the system illustrated in FIG. 1, the range detection channel 16 and the angle detection channel 18 are positioned with respect to the light source 10 in the manner noted, the detector in each channel 16, 18 senses quite a bit less than the maximum amount of reflected light. As a result, the system may not be as sensitive as it might otherwise be insofar as its ability to detect the reflected light.

Given the foregoing, it would be desirable to provide a relatively compact light detection system for detecting the position of a moving object, such as an automobile. In that way, the system can be more readily located at any desired location on the moving object. It would also be desirable to provide such a light detection system that is highly sensitive and accurate, and able to detect a maximum amount of light reflected off a reflector or retroreflector.

SUMMARY OF THE INVENTION

In accordance with one aspect of the present invention, an optical detection system includes a transmitting arrangement for transmitting a light beam to create a field of view, a detecting arrangement for detecting a beam of reflected light resulting from reflection of the transmitted light off at least one object in the field of view, and a deflecting device for deflecting either the transmitted light beam or the reflected light beam. The detecting means can include a range channel having a first detector for sensing reflected light from the at least one object to determine the distance to the object, and an angle channel having a second detector for sensing reflected light from the at least one object to determine an angle of the reflected light beam. The deflecting device either deflects the transmitted light beam as it passes through the deflecting device while also allowing the reflected light beam to pass through the deflecting device without being deflected, or deflects the reflected light beam as it passes through the deflecting device while allowing the transmitted light beam to pass through the deflecting device without being deflected. The transmitted light beam emerging from the deflecting device is coaxial with the reflected light beam entering the deflecting device. The system can also include an arrangement disposed between the deflecting device and the detecting device for splitting the reflected light beam into two beam components that include a first beam component directed to the first detector and a second beam component directed to the second detector.

In accordance with a preferred embodiment of the present invention, the first sensor can comprise a single photosensitive diode while the second sensor can include a CCD array or a photo-diode array. The deflecting device for deflecting either the transmitted light beam or the reflected light beam can be in the form of a polarizing beamsplitter. A half-wave plate positioned in front of the polarizing beamsplitter rotates the polarization plane of the transmitted light beam and the polarization plane of the reflected light beam through an angle of about forty-five degrees so that the polarization plane of the transmitted light beam before passing through the half-wave plate is arranged at approximately ninety degrees with respect to the polarization plane of the reflected light beam after the reflected light beam passes through the half-wave plate.

The present invention also provides a vehicle guidance system for optically guiding a moving vehicle along a path. The system includes a transmitting device for transmitting a light beam from a moving vehicle to create a field of view, and a detecting device for detecting a beam of reflected light resulting from reflection of the transmitted light off at least one object in order to automatically steer the vehicle along a path. The detecting device can include a range channel having a first detector for sensing the reflected light beam in order to determine a distance from the moving vehicle to the object, and an angle channel having a second detector for sensing the reflected light beam in order to determine an angle of the reflected light beam. The vehicle guidance system can also include a deflecting arrangement for deflecting either the transmitted light beam or the reflected light beam. The deflecting device either deflects the transmitted light beam as it passes through the deflecting device while also allowing the reflected light beam to pass through the deflecting device without being deflected, or deflects the reflected light beam as it passes through the deflecting device while allowing the transmitted light beam to pass through the deflecting device without being deflected. The transmitted light beam emerging from the deflecting device is coaxial with the reflected light beam entering the deflecting device, thereby resulting in minimization of the optical axes so that the size of the housing encompassing the various components can be made relatively compact.

In accordance with the preferred embodiment, the deflecting arrangement can be in the form of a polarizing beamsplitter. A half-wave plate positioned in front of the polarizing beamsplitter operates in conjunction with the polarizing beamsplitter to rotate the polarization plane of the transmitted light beam and the polarization plane of the reflected light beam. In that way, in the embodiment in which the transmitted light beam is deflected, the half-wave plate rotates the polarization plane of the transmitted light beam and the polarization plane of the reflected light beam so that the reflected light beam passes through the beamsplitter without being substantially deflected. On the other hand, in the case where the transmitted light beam passes straight through the polarizing beamsplitter, the polarization planes of the transmitted light beam and the reflected light beam are rotated so that the reflected light beam is deflected by the polarizing beamsplitter.

Another aspect of the present invention involves a method for detecting the position of an object relative to a moving vehicle such as an automobile. The method involves transmitting a light beam from a vehicle to create a field of view in front of the vehicle and then detecting a reflected light beam that is substantially coaxial with the transmitted light beam and that results from the reflection of the transmitted light beam off at least one object in the field of view. The detecting step includes sensing reflected light from the at least one object to determine a distance between the vehicle and the at least one object, and sensing reflected light from the at least one object to determine an angle of the reflected light beam. The angle of the reflected light beam and the distance between the vehicle and the at least one object can then used to determine the position of the vehicle relative to the at least one object.

BRIEF DESCRIPTION OF THE DRAWING FIGURES

The features of the present invention will become more apparent from the detailed description set forth below, considered in conjunction with the drawing figures in which like elements bear like reference numerals, and wherein.

Figure 6:
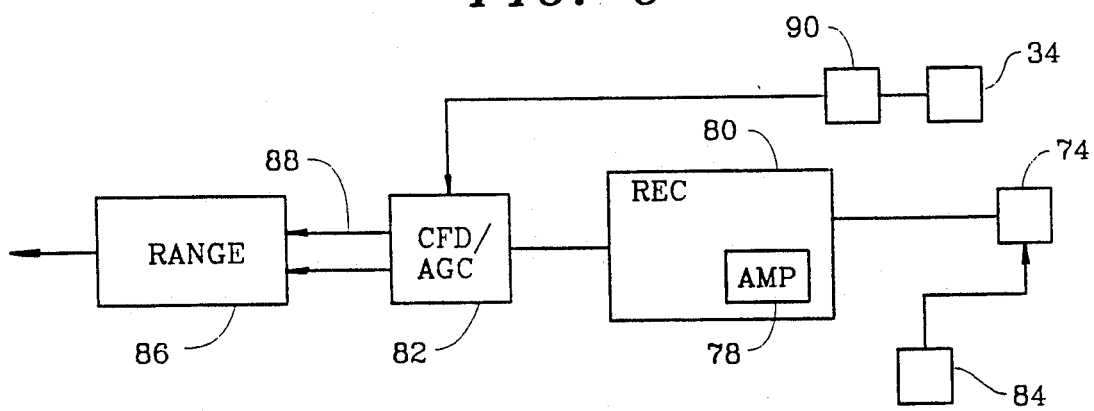
Figure 7:
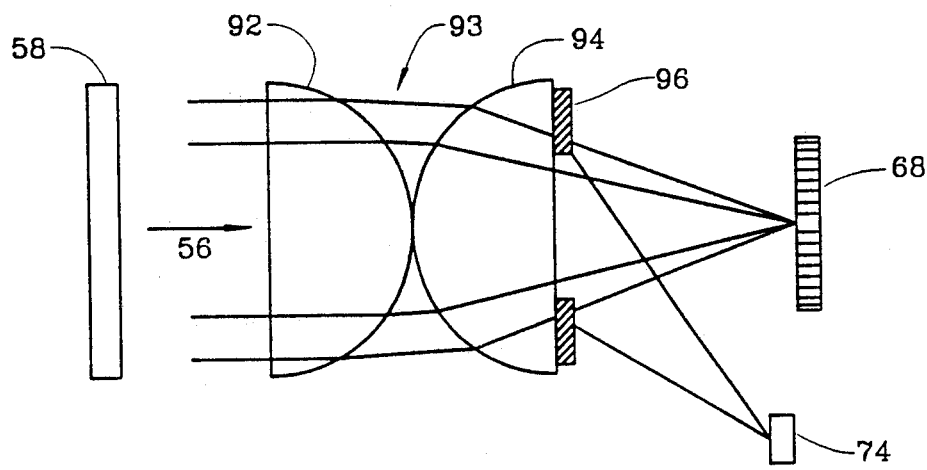

FIG. 6 is a schematic illustration of a portion of the range detection channel which can be employed in the system of the present invention; and FIG. 7 illustrates an alternative arrangement usable in conjunction with either of the systems shown in FIGS. 2-5 for splitting the reflected light beam into two beam components which are directed at the detectors that form a part of the range channel and the angle channel.

DETAILED DESCRIPTION OF THE PREFERRED EMBODIMENTS

Figure 2:
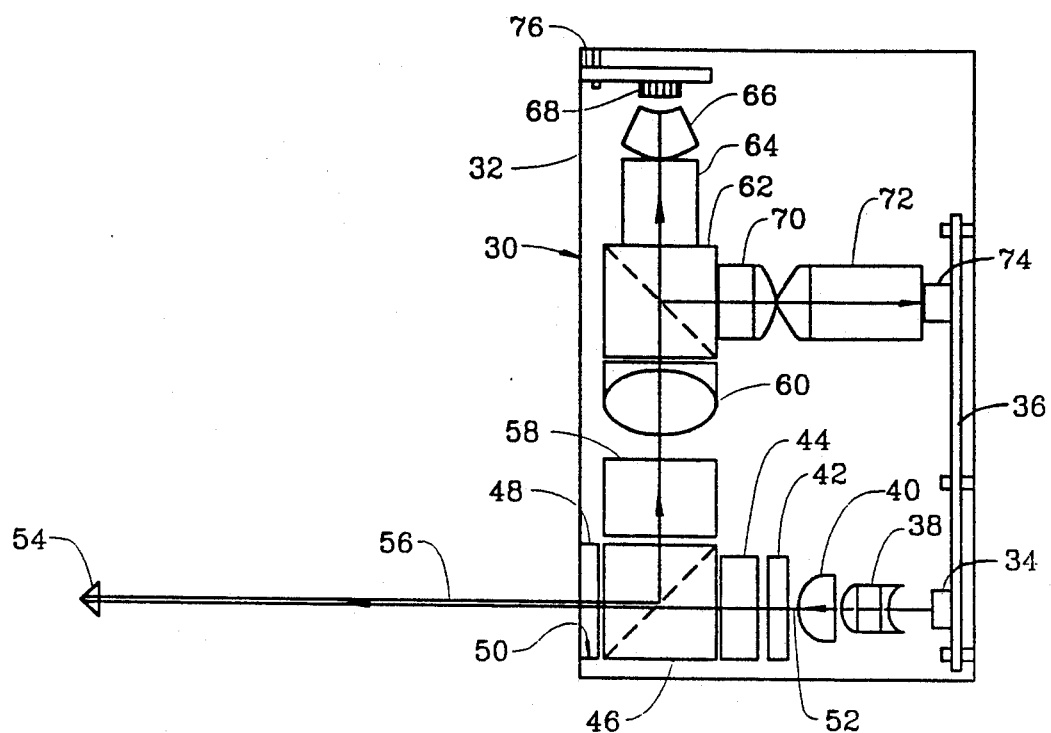
FIG. 2 is a cross-sectional view of one embodiment of the light detecting system of the present invention.

Referring initially to FIG. 2, one embodiment of a light based object detecting system 30 is illustrated. The system 30 comprises a housing 32 in which are located the various components which make up the system. The housing 32, with the enclosed components, is preferably mounted on a moving object whose position relative to a point or points is to be determined. For purposes of the discussion that follows, particular reference will be made to an automobile as the moving object which is to be controlled. However, it is to be understood that the invention is applicable to determining the position of any object that is to be guided along a predetermined path. By way of example, the present invention can also be used to control the movement of automated robots along a predetermined path.

In the following description, reference will also be made to use of a fixed field of view relative to a direction of vehicle movement. As referred to hereinafter, fixed refers to the use of a stationary (i.e., non-scanning) light source. It is to be understood, however, that a scanning light source can also be employed. Also, the field of view can be established in directions other than the forward direction. For instance, the field of view can be established in a lateral direction (i.e., beside the moving vehicle to control vehicle orientation) or in a direction opposite to that of vehicle movement for purposes of detecting other vehicles to thereby avoid collisions. Further, any combination of fields of view can be employed. For instance, a second lateral field of view can be used to derive additional information concerning yaw (i.e., rotation about a vertical axis of the vehicle).

Located within the housing 32 is a light source 34 that can be suitably secured to a mounting structure 36 in order to position the light source 34 in a stationary manner within the housing 32. The light source 32 emits a light beam 52 which illuminates a field of view in front of the automobile along the direction of travel. The light source 32 can, for example, be a medium power infrared diode laser light source that includes a transmitter operating at approximately 100 watts peak power on a wavelength of approximately 850 nanometers. In one preferred embodiment, the laser diode 32 provides a pulse width of 5 nanometers at a pulse rate of 2000 Hz. Although such a light source is preferred, any known laser may be used. Further, the light source can be a visible or ultraviolet (non-laser) light source.

In an alternative preferred embodiment, the light source 30 comprises a medium power infrared light source and an incandescent light source. In such an embodiment, the infrared light source can be pulsed to permit accurate range detection in a range detection channel. The incandescent light source can then be used to provide enhanced reflection intensity from reflectors or retroreflectors placed along the desired path of vehicle movement. The enhanced intensity reflections permit increased resolution of an angle channel detection without increasing the power intensity of the infrared light source.

Positioned in front of the laser diode 34 with respect to the direction of travel of the transmitted light beam 52 is a grated index micro lens 38 and a pair of generally spherical lenses 40, 42. The transmitted light beam 52 is typically a diverging beam and the grated index micro lens 38 serves to collimate that diverging light beam 52. The lenses 40, 42, on the other hand, function to controllably diverge the transmitted light beam 52 emerging from the grated index micro lens 38. The lenses 38, 40, 42 and the light source 30 are positioned along a common optical axis.

Positioned in front of the lenses 38, 40, 42 with respect to the direction of travel of the transmitted light beam 52 is a diffraction grating 44. The diffraction grating 44 can be designed to distribute laser power from the laser diode so that the distribution pattern of the laser light on the field of view is optimized. For example, the diffraction grating 44 can function to provide more power for targets (i.e., retroreflectors) located further away while also providing less power for closer targets (i.e., retroreflectors). It is also to be noted that the diffraction grating 44 typically functions at higher efficiency when the laser beam passing therethrough covers a wide area. Thus, the diverging function performed by the lenses 40, 42 facilitates efficient operation of the diffraction grating 44. The diffraction grating 44 is also positioned along the same common optical axis as the light source 30 and the lenses 38, 40, 42.

A polarizing beamsplitter 46 is positioned in front of and along the same optical axis as the diffraction grating 44. Polarizing beamsplitters and the characteristics associated with such devices are known in the art and thus, will not be described in detail here. However, generally speaking, the polarizing beamsplitter 46 comprises a pair of right angle prisms that are bonded together, hypotenuse-face-to-hypotenuse-face. A special multi-layered dielectric film can be positioned between the facing hypotenuse faces to impart certain desired characteristics to the polarizing beamsplitter. Depending upon the orientation of the polarization plane of the transmitted light beam 52, the transmitted light beam will either pass through the polarizing beamsplitter 46 without being deflected (when the polarization plane of the beamsplitter is parallel to the polarization plane of the transmitted light beam 52) or be deflected in some way by the beamsplitter 46 (when the polarization plane of the beamsplitter is not parallel to the polarization plane of the transmitted light beam 52). In the preferred embodiment illustrated in FIG. 2, the polarization plane of the light beam 52 transmitted by the laser diode 34 is parallel to the polarization plane of the polarizing beamsplitter 46 so that the transmitted light beam passes straight through the polarizing beamsplitter 46 in a substantially unaltered state.

A retardation plate 48 is positioned in front of the polarizing beamsplitter 46 along the same optical axis as the lenses 38, 40, 42, the light source 30, the diffraction grating 44 and the polarizing beamsplitter 46. Preferably, the retardation plate 48 is mounted within an opening 50 provided at the front end of the housing 32. In the preferred embodiment illustrated in FIG. 2, the retardation plate 48 takes the form of a half-wave plate. Part of the function served by the half-wave plate 48 is to rotate the polarization plane of the transmitted light beam 52 emerging from the beamsplitter 46 such that the polarization plane of the transmitted light beam which emerges from the half-wave plate 48 is oriented at forty-five degrees relative to the polarization plane of the light beam entering the half-wave plate 48.

The transmitted light beam 52 passing through the retardation plate 48 and emerging from the housing 32 will create a field of view that encompasses a reflector 54, preferably a retroflector. Light in the transmitted light beam 52 will reflect off the retroreflector 54 and return toward the housing 32 in the form of a reflected light beam 56. In practice, the retroreflector 54 can comprise a series of successively arranged retroreflectors 54. In the context of a vehicle guidance system, the retroreflectors 54 could be positioned along the side of the road.

The reflected light beam 56 passes through the retardation plate or half-wave plate 48 where its polarization plane is once again rotated through an angle of forty-five degrees. Thus, the polarization plane of the reflected light beam 56 emerging from the retardation plate 48 is oriented at ninety degrees with respect to the polarization plane of the transmitted light beam 52 that enters the retardation plate 48. As a result, when the reflected light beam 56 enters the polarizing beamsplitter 46, it is deflected as shown in FIG. 2 rather than being transmitted through the polarizing beamsplitter as in the case of the transmitted light beam 52.

After being deflected in the polarizing beamsplitter 46, the reflected light beam 56 passes through an interference filter 58 which filters out white light, for example. The white light that is filtered out by the interference filter 58 may be in the form of light from the sun, light emanating from road side lamps, or other types of light that could interfere with accurate detection of the reflected light beam 56.

The reflected light beam 56 then passes through an optical unit or lens 60, which, in combination with the lenses 64, 66 and 70, 72, forms a complete focusing system. After passing through the lens 60, the reflected light beam 56 enters a beamsplitter 62. The beamsplitter 62 can be in the form of an 80/20 beamsplitter which divides the reflected light beam 56 into two components. One of the components, representing approximately eighty percent of the reflected light, is directed through several optical units 64, 66 which, as noted above, cooperate with the optical unit 60 to focus the reflected light beam 56. The reflected beam is then directed towards a detector 68. The lenses 64, 66 are preferably selected depending upon the form of the detector 68, to provide proper focusing of the reflected beam on the detector 68. The detector 68 can be in the form of a charge-coupled device (CCD) array or a photo-diode array.

The other component of the reflected light beam 56, representing approximately twenty percent of the reflected light beam 56, emanates from the beamsplitter 62 and passes through several lenses or optical units 70, 72, which, as mentioned above, interact with the lens 60 to focus the reflected light beam. The reflected beam is then directed toward a detector 74. Once again, the lenses 70, 72 are preferably selected depending upon the form of the detector 73, to provide proper focusing of the reflected beam on the detector 74. The detector 74 may be in the form of a single photosensitive diode such as a single PIN diode. Alternatively, the detector 74 could be an avalanche photo-diode (APD). The detector 74 can be mounted on a supporting structure 36 disposed within the housing 32 in order to suitably fix the position of the detector 74. Likewise, the detector 68 can be mounted on suitable supporting structure 76.

The multiple lens system defined by the combination of lenses 60, 64, 66 and the combination of lenses 60, 70, 72 is advantageous as it introduces relatively few aberrations into the system (as compared to, for example, a single lens system), thereby resulting in higher image quality. In addition, the positioning of the lens 60 upstream of the beamsplitter 62 results in a more compact arrangement than would otherwise be the case if a similar lens were placed between the beamsplitter 62 and the lenses 64, 66, and between the beamsplitter 62 and lenses 70, 72.

As illustrated in FIG. 2, the polarizing beamsplitter 46, the filter 58, the lenses 60, 64, 66, the beamsplitter 62 and the detector 68 are positioned along a common optical axis. Likewise, the lenses 70, 72 the beamsplitter 62 and the detector 74 share a common optical axis.

The single detector 74 in combination with the optical units or lenses 70, 72 form a part of a range channel for sensing reflected light from the retroreflector 54 in order to determine the distance from the vehicle to the retroreflector 54. The specific details of the range channel are discussed in the aforementioned U.S. Pat. No. 5,162,643. Generally speaking, the range channel can include features such as those illustrated in FIG. 6.

With reference to FIG. 6, light received by the single detector 74 is converted to an electrical signal and input to a single pre-amplifier 78. The pre-amplifier 78 can, for example, be included as part of an APD receiver 80 which also includes a post amplifier and a variable gain amplifier.

The variable gain is controlled by a constant fraction discriminator and automatic gain control (AGC) board 82. The constant fraction discriminator selects the point in time at which a reflected pulse receives fifty percent of its maximum intensity as the pulse arrival time. A voltage bias circuit, such as an APD bias 84, is provided to bias the detector 72 when received light energy is being transferred to the pre-amplifier 78 in known fashion.

An output from the constant fraction discriminator 82 is input to a range counter 86. The range counter 86 also receives an input 88 via the constant fraction discriminator from a light transmit sensor 90. The light transmit sensor 90 outputs a pulse to the range counter each time a light pulse is actually emitted from the light source 34. (i.e., at the 2,000 Hz pulse rate). The pulse from the light transmit sensor 90 activates the range counter 86 to initiate a counting of clock pulses in known fashion. The range counter 52 continues to count clock pulses until a pulsed output is received by the APD detector. Thus, the range counter 86 stores a count proportional to the time required for a light pulse to travel from the light source 34 to one of the retroreflectors 54 and back to the range channel.

The optical units or lenses 64, 66 in combination with the CCD array 68 generally form a part of an angle channel for sensing reflected light and determining the angle of the reflected light beam. The lenses 64, 66 focus an image of the retroreflectors on the CCD array or photo-diode array 68. The CCD array or photo-diode array 68 can be in the form of a row of relatively small light sensitive detectors, each of which integrates the amount of light received over a predetermined period of time. Since the CCD array of photo-diode array 68 is not used to detect light for the relatively fast range channel, the CCD array or photo-diode array 68 can be permitted to detect light over a period corresponding to, for example, the transmission of plural light pulses from the light source 34.

Further detailed information concerning the way in which the range channel and the angle channel operate to determine the distance from the moving vehicle to the reflector and the angle of the reflected light beam is set forth in the aforementioned U.S. Pat. No. 5,162,643, the entire disclosure of which is incorporated herein by reference. In addition, the way in which the angle and range information derived from the angle channel and the range channel is processed to control vehicle steering is described in detail in co-pending U.S. patent application Ser. No. 07/592,235, filed on Oct. 9, 1990, the entire disclosure of which is also incorporated herein by reference. Those particular aspects of the system are not described in detail here since the particular features of the present invention involve other aspects of the system.

In operation, a light beam transmitted by the laser diode 34 is collimated, focused, and controllably diffracted toward the beamsplitter 46 as a result of passage through the lenses 38, 40, 42 and the diffraction grating 44. The polarizing beamsplitter 46 and the laser diode 34 are designed in such a way that the polarization plane of the transmitted light beam 52 allows the light beam 52 to pass straight through the polarizing beamsplitter 46 without being altered or deflected (i.e., without being substantially altered or deflected). The transmitted light beam 52 passes through the retardation plate 48 whereupon its polarization plane is rotated.

After being reflected from one or more retroreflectors 54, the transmitted light beam returns to the housing 32 in the form of a reflected light beam 56 which once again passes through the retardation plate 48. The reflected light beam 56 entering the housing 32 and passing through the retardation plate 48 is coaxial (i.e., substantially coaxial) with the transmitted light beam 52 that emerged from the polarizing beamsplitter 46 and passed through the retardation plate 48. Upon passing through the retardation plate 48, the polarization plane of the reflected light beam 56 is oriented with respect to the beamsplitter 46 in such a way that the deflected light beam 56 is deflected substantially in its entirety as it passes through the beamsplitter 46. That is, the reflected light beam 56 emerging from the beamsplitter 46 is generally perpendicular to the reflected light beam 56 entering the beamsplitter 46.

It has been found that the use of a polarizing beamsplitter 46 possesses significant advantages as compared to a conventional beamsplitter such as a half-mirror. In the case of a half-mirror beamsplitter, the amount of light in the transmitted light beam 52 that would normally be transmitted through the half-mirror would be only approximately fifty percent. The remaining portion would be deflected away from the intended retroreflector 54. Likewise, the amount of reflected light 56 that would be deflected towards the detection arrangement would be reduced by about fifty percent. Thus, at best, only half of the transmitted light beam 52 would actually be directed out of the housing 32 to the field of view in which the reflectors 54 are located. Upon being reflected, the amount of light would be further reduced by fifty percent when once again contacting the half-mirror.

In contrast, through use of the polarizing beamsplitter 46, it has been found that more than ninety-seven percent of the light in the transmitted light beam 52 passes through the beamsplitter 46 to define a field of view encompassing the retroreflectors 54. Likewise, approximately ninety-seven percent of the reflected light entering the polarizing beamsplitter 46 is deflected towards the detection arrangement. Thus, much higher accuracy is possible with the polarizing beamsplitter 46 since a significantly greater amount of light is returned to the angle and range detection channels.

The deflection of the reflected light beam 56 by the polarizing beamsplitter 46 results in the reflected light beam 56 being directed toward the detectors 68, 74 which form a part of the angle and range detection channels. White light and/or other potential interference is filtered out by the filter 58, and the filtered reflected light beam 56 then passes through the lens unit 60 and into the beamsplitter 62. The beamsplitter 62 causes approximately eighty percent of the reflected light beam 56 to be directed at the CCD array or photodiode array 68 and approximately twenty percent of the reflected light beam to be directed at the detector 72. The range and angle detection channels, operating in the manner described in detail in U.S. Pat. No. 5,162,643, provide information that can then be processed in the manner described in detail in U.S. patent application Ser. No. 07/592,235, to control vehicle steering. Of course, in the context of systems other than vehicle guidance systems, the information provided by the angle and range detection channels can be used to control movement and related activities of other types of devices.

Figure 1:
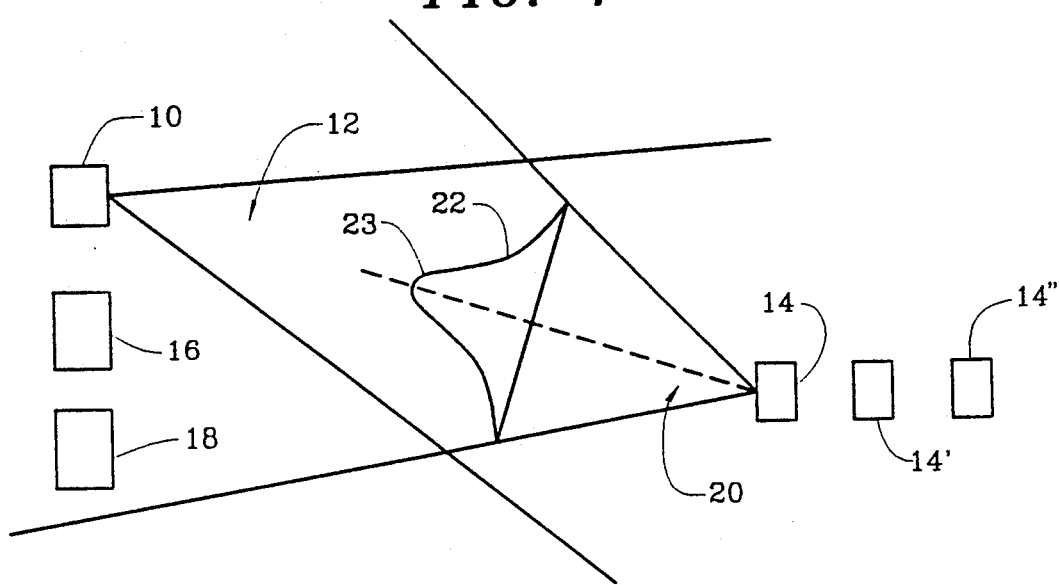
FIG. 1 is a general schematic illustration of a known type of light detection system.
Figure 3:
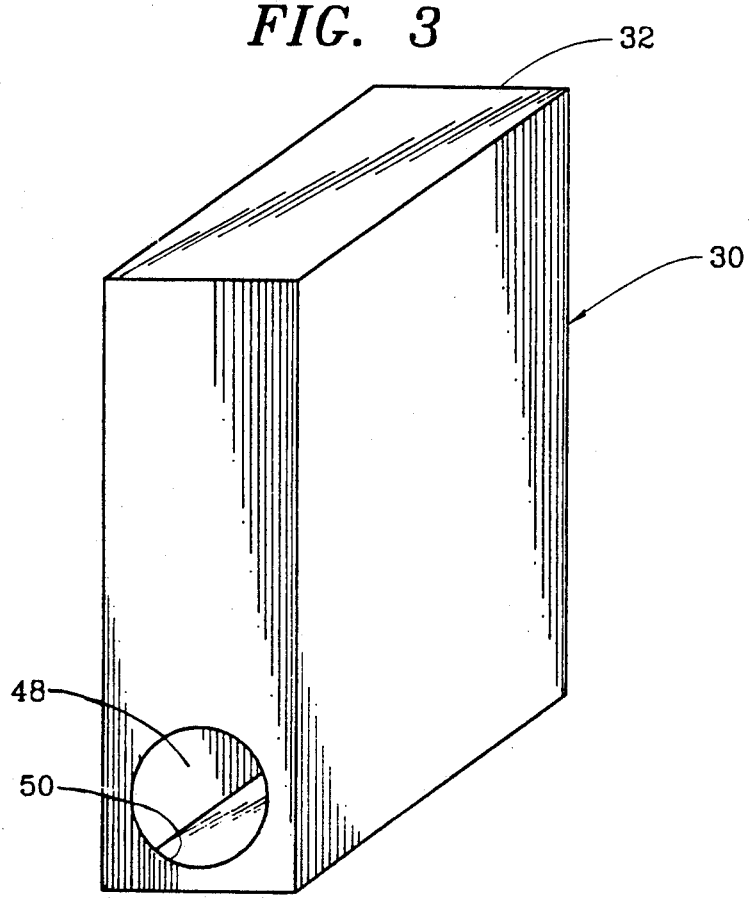
FIG. 3 is a perspective view of the housing for containing the components of the system shown in FIG. 2.

The system illustrated in FIGS. 2 and 3 provides certain improvements with respect to a system such as the one shown in FIG. 1. With general reference to FIG. 1, the system of the present invention is designed in a way that helps ensure that the reflected light which is detected by the detection arrangement (i.e., the range detection channel and the angle detection channel) is in the middle region of the reflected light beam (i.e., in the region 23 of the curve shown in FIG. 1). As noted above, that region of the reflected beam possesses the maximum amount of light (i.e., the greatest concentration of light). The system according to the present invention is able to achieve that advantageous result due at least in part to the substantially coaxial and parallel nature of the reflected light beam 56 which enters the housing 32 and the transmitted light beam 52 which emerges from the beamsplitter 46. Consequently, the system according to the present invention as illustrated in FIGS. 2 and 3 is highly sensitive. As a result, the system is well suited to accurately determine the position and orientation of the vehicle relative to the retroreflector so that the vehicle can be automatically steered along the intended path.

In addition, the system illustrated in FIG. 1, the system of the present invention as shown in FIGS. 2 and 3 does not result in several optical axes. Rather, only a single optical axis is required. The result is that the housing which encompasses the various components can be made relatively compact. Compared to the housing required to house the arrangement of components disclosed in U.S. Pat. No. 5,162,643, it has been found that the arrangement of components illustrated in FIG. 2 can permit achievement of a five-fold decrease in size (i.e., volume) with the greatest dimension being on the order of about four inches. The housing 32 for encasing the system of components shown in FIGS. 2 and 3 can take the form shown in FIG. 3 in which the housing is taller than it is deep.

Figure 4:
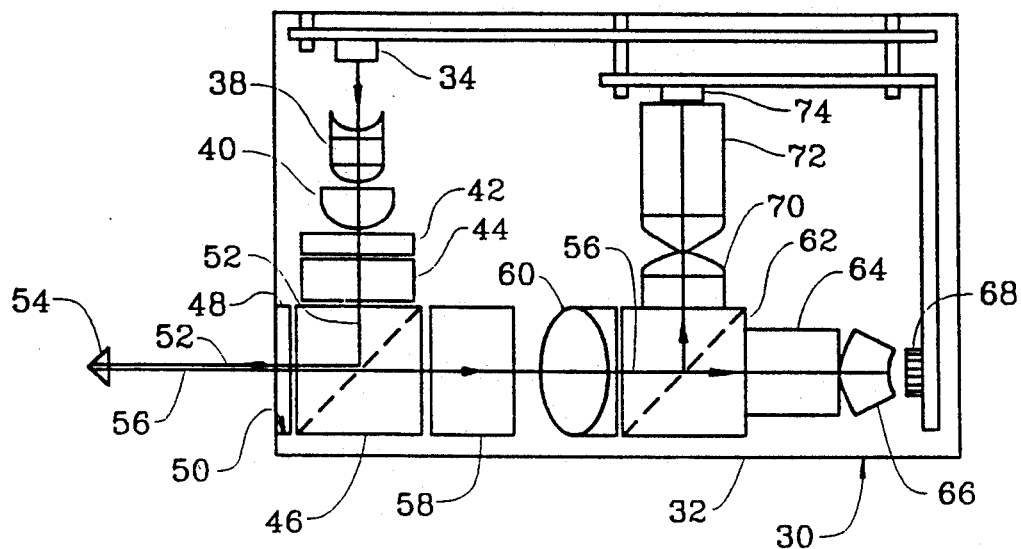
FIG. 4 is a cross-sectional view of another embodiment of the light detecting system of the present invention.
Figure 5:
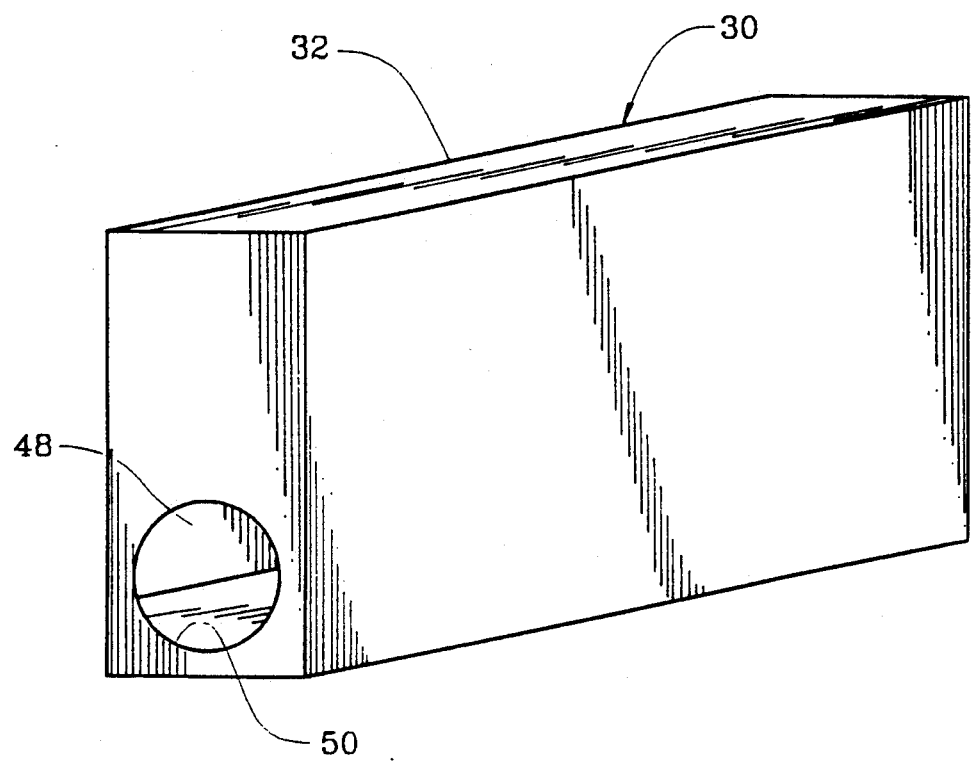
FIG. 5 is a perspective view of the housing for containing the components of the system shown in FIG. 4.

FIGS. 4 and 5 illustrate a light detection system according to another embodiment of the present invention. The elements in the embodiment illustrated in FIGS. 4 and 5 which correspond to those illustrated in FIGS. 2 and 3 are designated by corresponding reference numerals. The system illustrated in FIGS. 4 and 5 is essentially the same as that illustrated in FIGS. 2 and 3 except that in the embodiment illustrated in FIGS. 4 and 5, the laser diode 34 and the polarizing beamsplitter 46 are designed in such a way that the transmitted light beam 52 is deflected in the polarizing beamsplitter 46 while the reflected light beam 56 passes through the polarizing beamsplitter 46 without being altered or deflected (i.e., without being substantially altered or deflected). That is in contrast to the system illustrated in FIGS. 2 and 3 in which the reflected light beam 56 is deflected by the beamsplitter 46 while the transmitted light beam 52 passes through the beamsplitter 46 without being substantially deflected.

To describe the system shown in FIG. 4 in more detail, the laser diode 34 emits a transmitting light beam 52 that passes through the grated index microlens 38, where it is collimated, and through the optical units or lenses 40, 42, where it is controllably diverged. After also passing through the diffraction grating 44, which functions in the manner described above in connection with the FIG. 2 embodiment, the transmitted light beam 52 is deflected in the polarizing beamsplitter 46 towards the retardation plate 48. To achieve that result, the laser diode 34 is designed to transmit a light beam whose polarization plane causes the transmitted light beam 52 to be deflected in the polarizing beamsplitter 46. In other words, the laser diode 34 illustrated in FIG. 4 is rotated ninety degrees with respect to the orientation of the laser diode 34 shown in FIG. 2.

Upon being deflected, the transmitted light beam is directed through the retardation plate 48 so that the polarization plane of the transmitted light beam 52 is rotated. After reflection from the retroreflector 54, the light returns in the form of a reflected light beam 56 that once again passes through the retardation plate 48. After passing through the retardation plate 48 and having its polarization plane rotated, the reflected light beam 56 is able to pass directly through the polarizing beamsplitter 46 without being deflected or altered (i.e., without being substantially altered or deflected). The reflected light beam 56 then passes through the interference filter 58 to filter out white light and/or other interference, through the optical unit or lens 60, and into the 80/20 beamsplitter 62.

As in the case of the embodiment illustrated in FIGS. 2 and 3, the beamsplitter 62 divides the reflected beam 56 into two components. One of the components, which comprises approximately eighty percent of the reflected light beam, is directed towards the angle channel which includes optical units or lenses 64, 66 and the CCD array or photo-diode array 68. The other component of the reflected light beam, which amounts to approximately twenty percent of the reflected light beam, is directed to the range channel that includes optical units or lenses 70, 72 and the single detector 74 which may be in the form of a PIN diode.

As in the case of the embodiment illustrated in FIGS. 2 and 3, the system illustrated in FIGS. 4 and 5 is designed so that the reflected light beam 56, which enters the housing 32 and is eventually detected by the angle and range channels, is coaxial (i.e., substantially coaxial) with the transmitted light beam which emerges from the beamsplitter 46. Thus, the system is able to quite accurately sense and determine the location and orientation of the moving vehicle along the intended path relative to the retroreflectors 54 since the maximum amount of reflected light is directed into the housing and detected by the range and angle detection channels.

In addition, a system designed in the manner illustrated in FIGS. 4 and 5 affords a much more compact design that might otherwise be possible due to the fact that the housing need not be designed to accommodate multiple optical axes. Indeed, it has been found possible to construct the housing 32 to have a relatively compact size similar to that discussed above in connection with the embodiment shown in FIG. 3. In the case of the embodiment shown in FIGS. 4 and 5, the housing 32 is deeper than it is tall. Further, the embodiments of the system shown in FIGS. 2-5 allow the diameter of the retardation plate 48 to be approximately one inch. The compact nature of the unit makes it much more easily placeable on a motor vehicle or any other object in which it is to be used.

FIG. 7 illustrates an alternative arrangement for a portion of the range channel and the angle channel utilized in the systems disclosed FIGS. 2-5. As illustrated in FIG. 7, a common lens unit comprised of two lenses 92, 94 are positioned between the interference filter 58 on the one hand, and the CCD array or photo-diode array 68 and single detector 74 on the other hand. The reflected light beam 56 passes through the common lens unit where it is collimated and focused towards the two detectors 68, 74. The portion of the light beam passing through the outer regions of the common lens unit 93 is deflected towards the single detector 74 (e.g., the PIN diode) while the portion of the beam passing through the central region of the common lens unit 93 is directed to the CCD array or photo-diode array 68. The light in the outer regions of the common lens unit 93 is deflected to the single detector 74 through use of a ring-shaped holographic diffraction grating 96 that is secured to the end face of the lens 94 in any suitable manner.

As is known, the outer regions of spherical optics such as the lenses 92, 94 shown in FIG. 7 produce aberrations which can affect imaging performance. However, in the case of the detector 74 (i.e., the PIN diode) image quality is not of paramount importance. Thus, deflecting the portions of the beam passing through the outer regions of the lenses 92, 94 toward the deflector 74 is acceptable. In the case of the detector 68 (i.e., CCD array or photo-diode array), however, image quality is important in ensuring accurate angle detection. Thus, the portion of the beam which passes through the center region of the lenses 92, 94 and which is not imparted with the same aberrations as the portion of the beam passing through the outer regions of the lenses, is directed at the CCD array or photo-diode array 68.

The common lens unit 93 and the associated ring-shaped holographic diffraction grating can take the place of the optical units or lenses 60, 64, 66, 70, 72 and the 80/20 beamsplitter 62 illustrated in conjunction with the systems shown in FIGS. 2-5. Nevertheless, the use of the arrangement illustrated in FIG. 7 is consistent with the objective of producing a light detection system that is relatively small and compact in size.

The principles, preferred embodiments and modes of operation of the present invention have been described in the foregoing application. The invention which is intended to be protected herein should not, however, be construed as limited to the particular forms disclosed, as they are to be regarded as illustrative rather than restrictive. Variations and changes may be made, and equivalents employed, without departing from the spirit of the present invention as set forth in the claims. Accordingly, the foregoing detailed description should be considered exemplary in nature and should not serve to limit the scope and spirit of the present invention as set forth in the appended claims.

What is claimed is:

1. An optical detection system, comprising:
   transmitting means for transmitting a light beam to create a field of view;
   detecting means for detecting a reflected light beam resulting from reflection of the transmitted light off at least one object in the field of view, said detecting means including a range channel having a first detector for sensing reflected light from the at least one object to determine a distance to the object, and an angle channel having a second detector for sensing reflected light from the at least one object to determine an angle of the reflected light beam;
   deflecting means through which the transmitted light beam and the reflected light beam pass for either deflecting the transmitted light beam as it passes through the deflecting means while allowing the reflected light beam to pass through the deflecting means without being deflected, or deflecting the reflected light beam as it passes through the deflecting means while allowing the transmitted light beam to pass through the deflecting means without being deflected;

means disposed between said deflecting means and said detecting means for splitting the reflected light beam into two beam components that include a first beam component which is directed to the first sensor and a second beam component which is directed to the second sensor.

2. The optical detection system according to claim 1, wherein said second sensor is one of a CCD array and a photo-diode array.

3. The optical detection system according to claim 1, wherein said first sensor is a single photosensitive diode.

4. The optical detection system according to claim 1, wherein said deflecting means is a polarizing beamsplitter.

5. The optical detection system according to claim 4, including polarization plane rotating means for rotating a polarization plane of the transmitted light beam and the reflected light beam, said polarization plane rotating means being positioned in front of said polarizing beamsplitter so that the transmitted light beam passes through said polarizing beamsplitter and then through the polarization plane rotating means.

6. The optical detection system according to claim 5, wherein said transmitting means and the polarizing beamsplitter are constructed such that the transmitted light beam passes said polarizing beamsplitter without being deflected and the light beam is deflected by said polarizing beamsplitter.

7. The optical detection system according to claim 6, wherein the polarization plane rotating means is a half-wave plate that rotates the polarization plane of the transmitted light beam and the polarization plane of the reflected light beam through an angle of forty-five degrees so that the polarization plane of the transmitted light beam before passing through the half-wave plate is arranged at ninety degrees with respect to the polarization plane of the reflected light beam after the reflected light beam passes through the half-wave plate.

8. The optical detection system according to claim 5, wherein said transmitting means and said polarizing beamsplitter are constructed so that the transmitted light beam is deflected by said polarizing beamsplitter and the reflected light beam passes through said polarizing beamsplitter without being deflected.

9. The optical detection system according to claim 8, wherein the polarization plane rotating means is a half-wave plate that rotates the polarization plane of the transmitted light beam and the polarization plane of the reflected light beam through an angle of forty-five degrees so that the polarization plane of the transmitted light beam before passing through the half-wave plate is arranged at ninety degrees with respect to the polarization plane of the reflected light beam after the reflected light beam passes through the half-wave plate.

10. The optical detection system according to claim 1, wherein said means for splitting the reflected light beam includes a ring-shaped holographic diffraction grating.

11. The optical detection system according to claim 1, wherein said means for splitting the reflected light beam includes a beamsplitter that directs approximately eighty percent of the reflected light beam toward the second detector and approximately twenty percent of the reflected light beam toward the first detector.

12. The optical detection system according to claim 1, wherein the transmitted light beam emerging from the deflecting means is substantially coaxial with the reflected light beam entering the deflecting means.

13. A vehicle guidance system for optically guiding a moving vehicle along a path, comprising:

transmitting means for transmitting a light beam from a moving vehicle to create a field of view;

detecting means for detecting a beam of reflected light resulting from reflection of the transmitted light off at least one object in order to automatically steer the vehicle along a path, said detecting means including a range channel having a first detector for sensing the reflected light beam in order to determine a distance from the moving vehicle to the at least one object and an angle channel having a second detector for sensing the reflected light beam in order to determine an angle of the reflected light beam; and deflecting means through which the transmitted light beam and the reflected light beam pass for either deflecting the transmitted light beam as it passes through the deflecting means while allowing the reflected light beam to pass through the deflecting means without being deflected, or deflecting the reflected light beam as it passes through the deflecting means while allowing the transmitted light beam to pass through the deflecting means without being deflected.

14. The vehicle guidance system according to claim 13, wherein said second sensor is one of a CCD array and a photo-diode array.

15. The vehicle guidance system according to claim 13, including means disposed between the deflecting means and the detecting means for splitting the reflected light beam into two beam components that include a first beam component which is directed to the first detector and a second beam component which is directed to the second detector.

16. The vehicle guidance system according to claim 13, wherein said deflecting means is a polarizing beamsplitter.

17. The vehicle guidance system according to claim 13, including polarization plane rotating means for rotating a polarization plane of the transmitted light beam and the polarization plane of the reflected light beam, said polarization plane rotating means being positioned in front of said deflecting means and then through the polarization plane rotating means.

18. The vehicle guidance system according to claim 17, wherein said transmitting means and the polarization beamsplitter are constructed such that the transmitted light beam passes through said deflecting means without being deflected and the reflected light beam is deflected by said deflecting means.

19. The vehicle guidance system according to claim 17, wherein the polarization plane rotating means is a half-wave plate that rotates the polarization plane of the transmitted light beam and the polarization plane of the reflected light beam through an angle of forty-five degrees so that the polarization plane of the transmitted light beam before passing through the half-wave plate is arranged at ninety degrees with respect to the polarization plane of the reflected light beam after the reflected light beam passes through the half-wave plate.

20. The vehicle guidance system according to claim 17, wherein said transmitting means and said polarizing beamsplitter are constructed such that the transmitted light beam is deflected by said polarizing beamsplitter and the reflected light beam passes through said polarizing beamsplitter without being deflected.

21. The vehicle guidance system according to claim 15, wherein said means for splitting the reflected light beam includes a ring-shaped holographic diffraction grating.

22. The vehicle guidance system according to claim 15, wherein said means for splitting the reflected light beam includes a beamsplitter that directs approximately eighty percent of the reflected light beam toward the second detector and approximately twenty percent of the reflected light beam toward the first detector.

23. The vehicle guidance system according to claim 13, wherein the transmitted light beam emerging from the deflecting means is coaxial with the light beam entering the deflecting means.

24. A method of detecting the position of an object relative to a moving vehicle, comprising:
   transmitting a light beam from a vehicle to create a field of view in front of the vehicle;
   detecting a reflected light beam that is substantially coaxial with the transmitted light beam and that results from reflection of the transmitted light beam off at least one object in the field of view;
   the step of detecting a reflected light beam including sensing reflected light from the at least one object to determine a distance between the vehicle and the at least one object, and sensing reflected light from the at least one object to determine an angle of the reflected light beam, the angle of the reflected light beam and the distance between the vehicle and the at least one object being used to determine the position of the vehicle relative to the at least one object.

25. The method according to claim 24, wherein said transmitted light beam passes through a polarizing beamsplitter and is deflected, and said reflected light beam passes through the polarizing beamsplitter without being deflected so that the transmitted light beam exiting the polarizing beamsplitter is coaxial with the reflected light beam entering the polarizing beamsplitter.

26. The method according to claim 25, wherein the transmitted light beam passes through a half-wave plate after being deflected by the polarizing beamsplitter in order to rotate a polarization plane of the transmitted light beam, and the reflected light beam passes through the half-wave plate before passing through the polarizing beamsplitter in order to rotate a polarization plane of the reflected light beam.

27. The method according to claim 26, wherein the polarization plane of the transmitted light beam and the polarization plane of the reflected light beam are rotated forty-five degrees upon passing through the half-wave plate so that the polarization plane of the transmitted light beam before passing through the half-wave plate is arranged at ninety degrees with respect to the polarization plane of the reflected light beam after passing through the half-wave plate.

28. The method according to claim 24, wherein said reflected light beam passes through a polarizing beamsplitter and is deflected, and said transmitted light beam passes through the polarizing beamsplitter without being deflected so that the transmitted light beam exiting the polarizing beamsplitter is substantially coaxial with the reflected light beam entering the polarizing beamsplitter.

29. The method according to claim 28, wherein said transmitted light beam passes through a half-wave plate after passing through the polarizing beamsplitter in order to rotate a polarization plane of the transmitted light beam by forty-five degrees, and the reflected light beam passes through the half-wave plate before passing through the polarizing beamsplitter in order to rotate a polarization plane of the reflected wave plate by forty-five degrees.

30. The method according to claim 24, including splitting the reflected light beam into one component that is directed to a range channel for detecting the distance between the vehicle and the at least one object, and another component that is directed to an angle channel to determine the angle of the reflected light beam.

* * * * *